United States Patent [19]
Willemse

[11] 3,980,731
[45] Sept. 14, 1976

[54] POLYESTER COMPOSITIONS WITH CARBONYL-CONTAINING COMPOUNDS

[75] Inventor: Franciscus Rutgerus Josef Willemse, Bathmen, Netherlands

[73] Assignee: Akzona Incorporated, Asheville, N.C.

[22] Filed: May 23, 1974

[21] Appl. No.: 472,875

[30] Foreign Application Priority Data
June 29, 1973 Netherlands .................... 7309060

[52] U.S. Cl. .................... 260/837 R; 260/836; 260/861; 526/14; 526/55; 526/57; 526/208; 526/227; 526/271; 526/292; 526/321
[51] Int. Cl.² ............ C08L 63/02; C08F 218/10
[58] Field of Search ............ 260/861, 837, 86.1, 260/89.5 R, 86.7, 88.3 A, 836

[56] References Cited
UNITED STATES PATENTS

| | | | |
|---|---|---|---|
| 3,227,779 | 1/1966 | Hopff | 260/861 |
| 3,334,155 | 8/1967 | Hopff | 260/861 |
| 3,466,259 | 9/1969 | Jernigan | 260/837 |
| 3,499,058 | 3/1970 | Kaufman | 260/861 |
| 3,502,602 | 3/1970 | Helm | 260/861 |
| 3,632,861 | 1/1972 | Hargis | 260/837 |
| 3,634,542 | 1/1972 | Dowd | 260/837 |
| 3,683,045 | 8/1972 | Baldwin | 260/837 |
| 3,720,592 | 3/1973 | Mani | 260/837 |
| 3,773,856 | 11/1973 | Takiyama | 260/837 |
| 3,810,826 | 5/1974 | Mani | 260/837 |
| 3,816,283 | 6/1974 | Mani | 260/837 |
| 3,832,268 | 8/1974 | Smith | 260/861 |
| 3,847,771 | 11/1974 | McGinniss | 260/861 |
| 3,856,643 | 12/1974 | Nakamoto | 260/861 |

*Primary Examiner*—Carman J. Seccuro
*Attorney, Agent, or Firm*—Stevens, Davis, Miller & Mosher

[57] ABSTRACT

Unsaturated polyester compositions which can be readily cured without the formation of gas are disclosed. The compositions contain a carbonyl-containing compound of the formula

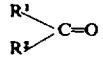

wherein $R^1$ is hydrogen, branched or unbranched alkyl, cycloalkyl, hydroxycarboalkylene, hydroxycarbocycloalkylene or hydroxycarboalkenylene, or substituted or unsubstituted aryl, aralkyl or hydroxycarboarylene; $R^2$ is hydrogen, hydroxyl, hydroxyperoxy, alkyloxy or aryloxy, or $R^1$ and $R^2$ can be combined to form a substituted or unsubstituted alkylenecarboxy, alkenylenecarboxy or arylenecarboxy group. Examples are maleic acid anhydride, tetrahydrophthalic acid anhydride, formic acid and n-butyraldehyde. The carbonyl-containing compound is preferably added in an amount of 0.01 to 10% by weight, calculated on the unsaturated polyester.

20 Claims, No Drawings

POLYESTER COMPOSITIONS WITH CARBONYL-CONTAINING COMPOUNDS

The present invention relates to a process for preparing an unsaturated polyester composition which is polymerisable or copolymerisable under the influence of a peroxidic initiator. The invention also relates to a process for polymerising or copolymerising an unsaturated polyester, as well as to polymers or copolymers when made by a process according to the invention.

Diesters and polyesters containing vinyl or vinylidene groups, which for simplicity will be called "polyesters" below, may be prepared by the polycondensation of $\alpha$, $\beta$-unsaturated monocarboxylic acids, for example acrylic or methacrylic acid, with di- or polyols. Such diols include ethylene glycol, propylene glycol, 2,2-bis (4-hydroxyphenyl) propane, 2,2-bis (4-hydroxycyclohexyl) propane and 2,2-bis (4-$\beta$-hydroxyethyloxyphenyl)-propane, for example; such polyols include pentaerythritol and dimers thereof, trimethylol-propane and glycerol, for example. Further, the complex diols or polyols described in Dutch Application 68-08040, German Application No. 1,645,379, U.S. Pat. Nos. 2,895,950 and 2,628,178, British patent specification Nos. 928,307 and 965,826 and French patent specification Nos. 1,404,000 may also be mentioned.

These esters may also be prepared by reacting $\alpha$, $\beta$-unsaturated monocarboxylic acids with compounds which contain epoxy groups; for example, bisphenol A bis (glycidylether). The polyesters containing vinyl or vinylidene groups hereinbefore described may be polymerised or, in the presence of unsaturated monomers, copolymerised under the influence of free-radical-generating compounds as initiators or mixtures of initiators.

Compounds with one or more vinyl or vinylidene groups, such as styrene, p-chlorostyrene, $\alpha$-methylstyrene, methylmethacrylate, methylacrylate, di-n-butylitaconate or vinyltoluene may be regarded as copolymerisable monomers.

The polymerisation or copolymerisation is preferably carried out at ambient temperature; in this case, the peroxidic initiator or the initiator mixture has to be used in combination with an accelerator.

It has already been proposed to carry out the polymerisation or copolymerisation at ambient temperature of the unsaturated polyesters hereinbefore described in the presence of a peroxidic initiator, such as hydrogen peroxide, or a ketone peroxide, such as methylethylketone peroxide or acetylacetone peroxide, preferably in combination with an organic cobalt compound as accelerator.

However, the use of these combinations has the drawback that gas formation occurs during the polymerisation or copolymerisation. Moreover, these combinations are markedly ineffective, as is apparent from the long geltime and slow curing involved in their use.

The present invention provides a process for preparing a composition mainly consisting of a polyester containing one or more vinyl or vinylidene groups or a mixture of such a polyester with a monomer containing one or more vinyl or vinylidene groups, which composition can be polymerised or copolymerised with a time acceptable in practice, while the formation of gas is avoided.

To this end, a compound having the general formula:

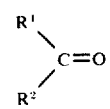

wherein $R^1$ represents a hydrogen atom or a branched or unbranched alkyl, cycloalkyl, hydroxycarboalkylene, hydroxycarbocycloalkylene or hydroxycarboalkenylene group, or a substituted or non-substituted aryl, aralkyl, or hydroxycarboarylene group; $R^2$ is a hydrogen atom or a hydroxyl, hydroxylperoxy, alkyloxy or aryloxy group; or $R^1$ and $R^2$ together form a substituted or non-substituted alkylenecarboxy, alkenylenecarboxy or arylenecarboxy group, is incorporated in the polyester hereinbefore described or in a mixture of the polyester with a monomer copolymerisable therewith, in a quantity sufficient to prevent the formation of gas during the polymerisation or copolymerisation.

The preferred carbonyl-containg compound to be added is a compound having the general formula:

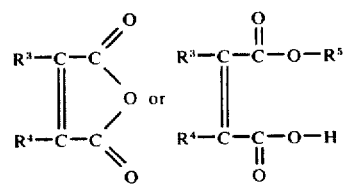

in which $R^3$ and $R^4$ are the same or different and each represents a hydrogen atom or an alkyl group, preferably a lower alkyl group, or in which $R^3$ and $R^4$ form together with the - C = C - moiety a substituted or unsubstituted phenylene group, and $R^5$ is a hydroxyl, alkyl, cycloalkyl or aryl group.

Examples of compounds which may be added according to the invention are: maleic anhydride, citraconic anhydride, itaconic anhydride, phthalic anhydride, trimellitic anhydride, tetrahydrophthalic anhydride, hexahydrophthalic anhydride, madic anhydride having the formula:

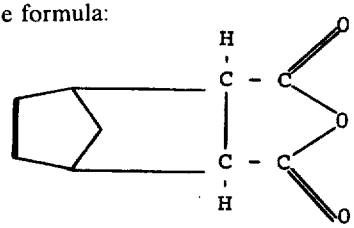

pyromellitic anhydride, tetrachlorophthalic anhydride, "HET" acid anhydride ("chlorendic anhydride") having the formula:

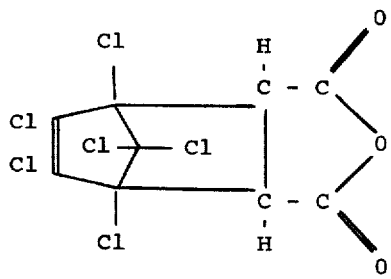

monoethylmaleinate, monocyclohexylmaleinate, monobutylmaleinate, monopermaleic acid, monoperphthalic acid, formic acid, formaldehyde, acetaldehyde, n-butyraldehyde and heptanal (oenanthol).

The compounds which may be added, according to the invention, are added to the unsaturated polyester to be cured or to the polyester-monomer mixture in a quantity of 0.01 to 10% by weight calculated on the unsaturated polyester.

Hydrogen peroxide or ketone peroxides, such as acetylacetone peroxide, methylethylketone peroxide, cyclohexanone peroxide or methylisobutylketone peroxide, may be used as an initiator or initiator mixture for the polymerisation or copolymerisation.

The polymerisation or copolymerisation may be carried out in the presence of phlegmatisers or solvents for the peroxide to be used, fillers, flame-retardants, stabilisers, sequestering agents or promoting agents.

When the polymerisation or copolymerisation is carried out at room temperature, a metallo-organic compound should desirably be used as an accelerator. Suitable accelerators are compounds derived from cobalt, iron, copper, vanadium, cerium, manganese, tin, silver and mercury, preferably organic cobalt, manganese, iron or vanadium compounds. These compounds are employed in an amount of 0.001 to 0.5 part, preferably 0.005 to 0.05 part by weight of metal calculated on the material to be polymerised.

It should be observed that the compounds to be used according to the invention do not necessarily have to be incorporated into the unsaturated polyester or the mixture of this polyester with a monomer copolymerisable therewith before the addition of the peroxidic initiator. This addition may also take place simultaneously with or after the addition of the initiator.

However, it is preferred to incorporate the compound into the polyester or the mixture of a polyester and a monomer copolymerisable therewith before the addition of the initiator.

It has been found that a composition consisting of a polyester or a mixture of a polyester and a monomer copolymerisable therewith, and a compound according to the invention has a storage stability which is sufficient in practice.

The following examples illustrate the invention. In these examples, solutions of cobalt, iron and manganese soaps of $C_6 - C_{18}$ carboxylic acids, having a metal content of 1% by weight, are used as accelerators. The geltime mentioned indicates the time after which a quantity of the mixture jellified in a test tube placed in a thermostat-bath at 20°C. The course of the curing was measured with the aid of a measuring apparatus according to the Persoz technique in the production of polyester sheets having a thickness of 1 mm. During the curing, these sheets were covered with tin foil in order to prevent air-inhibition and evaporation of the styrene used as the monomer. The quantity of gas was measured with the aid of a one-side closed burette which was filled with water and placed in a water tank in an inverted vertical position. A narrower tube connected with the reaction vessel, in which the components indicated in the examples were present, opened into this burette. When gas formation occurred, the gas bubbles collected in the burette and the total gas volume could be measured.

All determinations were carried out twice; the arithmetical average of each two determinations appears in the examples.

The experiments were carried out with the use of the following types of resins:

resin A — the condensation product of 2 moles of acrylic acid and 1 mole of bisphenol A bis (glycidyl ether) in a quantity of 55 parts by weight, in combination with 45 parts by weight of styrene;

resin B — the condensation product described in A in a quantity of 50 parts by weight in combination with 50 parts by weight of styrene;

resin C — the condensation product of 2 moles of methacrylic acid and 1 mole of bisphenol A bis ($\beta$-hydroxyethylether).

Therefore, all condensation products contained two vinyl or vinylidene groups per molecule.

EXAMPLE I

A 1.0 part by weight solution of cobalt-2-ethylhexanoate in dioctylphthalate having a content of 1% by weight of cobalt as metal and 1.0 part by weight of acetylacetone peroxide having an active oxygen content of 4% were added to 100 parts by weight of resin A. The geltime, curing and gas formation, if any, were measured in the way hereinbefore described.

In an analogous way, resin B was tested. The compositions used and the results obtained are tabulated in Table 1 below.

EXAMPLE II

A solution of cobalt-2-ethylhexanoate in dioctylphthalate having a content of 1% by weight of cobalt as metal (0.258) and 0.5 g of a solution of hydrogen peroxide in dimethylpthalate having an active oxygen content of 4% were added to 25 g of resin A. Subsequently, the quantity of gas formed was measured at 1 atms. and 20°C.

In an analogous way, resins B and C were tested. The compositions used and the quantities of gas measured are tabulated in Tables 2 and 3 below.

Table 1

| Composition | % by Weight | | | | | | | | | | | | | | | |
|---|---|---|---|---|---|---|---|---|---|---|---|---|---|---|---|---|
| resin A | — | — | — | — | 100 | 100 | 100 | — | — | — | — | — | — | — | — | — |
| resin B | 100 | 100 | 100 | 100 | — | — | — | 100 | 100 | 100 | — | — | 100 | 100 | — | — |
| co-accelerator | 1.0 | 1.0 | 1.0 | 1.0 | 1.0 | 1.0 | 1.0 | 1.0 | 1.0 | 1.0 | 100 | 100 | — | — | 100 | 100 |
| maleic acid anhydride | — | 0.5 | 1.0 | 2.0 | — | 0.5 | 1.0 | — | 1.0 | 0.5 | 1.0 | 1.0 | 1.0 | 1.0 | 1.0 | 1.0 |
| acetylacetone peroxide 4% act.O | 1.0 | 1.0 | 1.0 | 1.0 | 1.0 | 1.0 | 1.0 | — | — | — | — | 1.0 | 0.5 | 1.0 | — | 1.0 |
| methylethylketone peroxide 10.5% act.O | — | — | — | — | — | — | — | 2.0 | 2.0 | 2.0 | — | — | — | — | — | — |
| cyclohexanone peroxide 7% act.O | — | — | — | — | — | — | — | — | — | — | — | — | 2.0 | 2.0 | 2.0 | 2.0 |
| methylisobutylketone | | | | | | | | | | | | | | | | |

Table 1-continued

| Composition | % by Weight | | | | | | | | | | | | | | | |
|---|---|---|---|---|---|---|---|---|---|---|---|---|---|---|---|---|
| peroxide 10.2% act.O | — | — | — | — | — | — | — | — | 1.5 | 1.5 | — | — | — | — | | |
| gas formation* | + | − | − | − | + | − | − | + | − | − | + | − | + | − | + | − |
| geltime in min. at 20°C | >48h | 147 | 140 | 132 | >48h | 89 | 52 | 126 | 49 | 59 | 97 | 153 | 114 | 39 | >48h | 180 |
| curing after 6h | — | 88 | 30 | — | — | 161 | 200 | 14 | — | 107 | 15 | — | 25 | 75 | — | — |
| curing after 24h | — | 254 | 245 | 171 | — | 252 | 266 | 239 | 255 | 236 | 230 | 189 | 177 | 187 | — | — |

\*(+) = with formation of gas
\*(−) = no formation of gas

Table 2

| Composition | Grams | | | | | | | | | | | | |
|---|---|---|---|---|---|---|---|---|---|---|---|---|---|
| resin A | 25 | 25 | 25 | 25 | 25 | 25 | 25 | 25 | 25 | 25 | 25 | 25 | 25 |
| resin B | — | — | — | — | — | — | — | — | — | — | — | — | — |
| resin C | — | — | — | — | — | — | — | — | — | — | — | — | — |
| Co-2-ethylhexanoate | 0.25 | 0.25 | 0.25 | 0.25 | 0.25 | 0.25 | 0.25 | 0.25 | 0.25 | 0.25 | 0.25 | 0.25 | 0.25 |
| Mn-2-ethylhexanoate | — | — | — | — | — | — | — | — | — | — | — | — | — |
| Fe-2-ethylhexanoate | — | — | — | — | — | — | — | — | — | — | — | — | — |
| maleic acid anhydride | — | 0.5 | 0.0625 | — | — | — | — | — | — | — | — | — | — |
| phthalic acid anhydride | — | — | — | 0.25 | — | — | — | — | — | — | — | — | — |
| tetrachlorophthalic acid anhydride | — | — | — | — | 0.5 | — | — | — | — | — | — | — | — |
| citraconic acid anhydride | — | — | — | — | — | 0.25 | — | — | — | — | — | — | — |
| trimellic acid anhydride | — | — | — | — | — | — | 0.25 | — | — | — | — | — | — |
| formic acid | — | — | — | — | — | — | — | 0.25 | — | — | — | — | — |
| monocyclohexylmaleinate | — | — | — | — | — | — | — | — | 0.5 | 4.0 | — | — | — |
| formaldehyde | — | — | — | — | — | — | — | — | — | — | 0.25 | — | — |
| n-butyraldehyde | — | — | — | — | — | — | — | — | — | — | — | 0.5 | — |
| monopermaleic acid | — | — | — | — | — | — | — | — | — | — | — | — | 0.03 |
| $H_2O_2$ 4% act.O | 0.5 | 0.5 | 0.5 | 0.5 | 0.5 | 0.5 | 0.5 | 0.5 | 0.5 | 0.5 | 0.5 | 0.5 | 0.5 |
| acetylacetoneperoxide 4% act.O | — | — | — | — | — | — | — | — | — | — | — | — | — |
| methylethylketoneperoxide 10.5% act.O | — | — | — | — | — | — | — | — | — | — | — | — | — |
| cyclohexanone peroxide 7.0% act.O | — | — | — | — | — | — | — | — | — | — | — | — | — |
| gas formation in ml 20°C 1 atm. | 12.8 | 0.0 | 0.3 | 0.0 | 0.0 | 0.0 | 3.8 | 0.0 | 7.6 | 0.0 | 0.0 | 4.8 | 0.0 |

Table 3

| Composition | Grams | | | | | | | | | | | | | |
|---|---|---|---|---|---|---|---|---|---|---|---|---|---|---|
| resin A | 25 | 25 | 25 | 25 | 25 | 25 | — | — | — | — | — | — | — | — |
| resin B | — | — | — | — | — | — | 25 | 25 | 25 | 25 | — | — | — | — |
| resin C | — | — | — | — | — | — | — | — | — | — | 25 | 25 | 25 | 25 |
| Co-2-ethylhexanoate | 0.25 | 0.25 | 0.25 | 0.25 | 0.25 | 0.25 | — | — | — | — | 0.25 | 0.25 | 0.25 | 0.25 |
| Mn-2-ethylhexanoate | — | — | — | — | — | — | 0.25 | 0.25 | — | — | — | — | — | — |
| Fe-2-ethylhexanoate | — | — | — | — | — | — | — | — | 0.25 | 0.25 | — | 0.25 | — | 0.25 |
| maleic acid anhydride | — | 0.2 | — | 0.2 | — | 0.2 | — | 0.25 | — | 0.25 | — | 0.25 | — | 0.25 |
| $H_2O_2$ 4% act.O | — | — | — | — | — | — | 0.5 | 0.5 | 0.5 | 0.5 | 0.5 | 0.5 | 0.5 | 0.5 |
| acetylacetoneperoxide 4% act.O | 0.25 | 0.25 | — | — | — | — | — | — | — | — | — | — | — | — |
| methylethylketone peroxide 10.5% act.O | — | — | 0.5 | 0.5 | — | — | — | — | — | — | — | — | — | — |
| cyclohexanone peroxide 7.0% act.O | — | — | — | — | 0.375 | 0.375 | — | — | — | — | — | — | — | — |
| gas formation in ml 20°C 1 atm. | 6.0 | 0.0 | 6.5 | 0.0 | 6.4 | 0.0 | 12.7 | 0.0 | 6.0 | 0.0 | 12.8 | 0.0 | 12.8 | 0.0 |

What is claimed is:

1. A process for the preparation of a polymerizable or copolymerizable composition which comprises incorporating into one or more polyesters containing a vinyl or vinylidene group and prepared by the polycondensation of an α,β-unsaturated monocarboxylic acid with a diol or polyol or epoxy compound, or a mixture comprising such a polyester and a monomer copolymerizable therewith and containing one or more vinyl or vinylidene groups, a free radical generating peroxidic initiator and a carbonyl containing compound having the formula:

wherein $R^1$ represents a hydrogen atom or a branched or unbranched alkyl, cycloalkyl, hydroxycarboalkylene, hydroxycarbocycloalkylene or hydroxycarboalkenylene group or a substituted aryl, aralkyl or hydroxycarboarylene group, $R^2$ is a hydrogen atom or hydroxyl, hydroxylperoxy, alkoxy or aryloxy group, or $R^1$ and $R^2$ together form a substituted or unsubstituted alkylenecarboxy, alkenylenecarboxy or arylenecarboxy group, in an amount sufficient to prevent the formation of gas during the polymerization or copolymerization of the composition.

2. In a process for making a polymerizable or copolymerizable composition containing an unsaturated polyester prepared by esterification of an α,β-unsaturated monocarboxylic acid with a dihydric or polyhydric alcohol, the improvement which comprises mixing the said polyester with a compound having the formula:

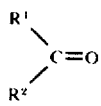

wherein $R^1$ and $R^2$ have the same meanings as in claim 1 to produce a stable composition adapted to polymerize without significant gas formation.

3. The process according to claim 1, in which a compound having the general formula:

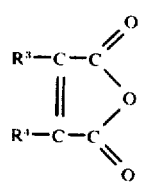

wherein $R^3$ and $R^4$ are the same or different and each represents a hydrogen atom or an alkyl group or wherein $R^3$ and $R^4$ form together with the attached ethylenediylidene group a substituted or unsubstituted phenyl group, is added as said carbonyl-containing compound.

4. The process according to claim 1, in which a compound having the general formula:

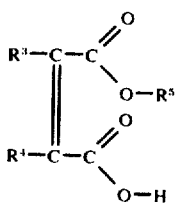

wherein $R^3$ and $R^4$ have the meanings defined in claim 2, and $R^5$ is a hydroxyl, alkyl, cycloalkyl or aryl group, is added as said carbonyl-containing compound.

5. The process according to claim 1, in which said carbonyl-containing compound is added in an amount of 0.01 to 10% by weight, calculated on the unsaturated polyester.

6. The process according to claim 3, in which said carbonyl-containing compound is added in an amount of 0.01 to 10% by weight, calculated on the unsaturated polyester.

7. The process according to claim 4, in which said carbonyl-containing compound is added in an amount of 0.01 to 10% by weight, calculated on the unsaturated polyester.

8. The process according to claim 3, in which said carbonyl-containing compound is maleic anhydride.

9. The process according to claim 3, in which said carbonyl-containing compound is phthalic anhydride.

10. The process according to claim 3, in which said carbonyl-containing compound is tetrachlorophthalic anhydride.

11. The process according to claim 3, in which said carbonyl-containing compound is citraconic anhydride.

12. The process according to claim 3, in which said carbonyl-containing compound is trimellitic anhydride.

13. The process according to claim 1, in which said carbonyl-containing compound is formic acid.

14. The process according to claim 1, in which said carbonyl-containing compound is monocyclohexylmaleinate.

15. The process according to claim 1, in which said carbonyl-containing compound is formaldehyde.

16. The process according to claim 1, in which said carbonyl-containing compound is n-butyraldehyde.

17. The process according to claim 1, in which said carbonyl-containing compound is monopermaleic acid.

18. The process according to claim 2, in which hydrogen peroxide is used as the initiator.

19. The process according to claim 2, in which a ketone peroxide is used as the initiator.

20. The process according to claim 2, in which the polymerisation or copolymerisation takes place in the presence of an accelerator.

* * * * *